United States Patent
Qassoud

(10) Patent No.: US 12,003,483 B1
(45) Date of Patent: Jun. 4, 2024

(54) SMART FIREWALL FILTERING IN A LABEL-BASED NETWORK

(71) Applicant: Juniper Networks, Inc., Sunnyvale, CA (US)

(72) Inventor: Amin Qassoud, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 699 days.

(21) Appl. No.: 16/710,918

(22) Filed: Dec. 11, 2019

(51) Int. Cl.
*H04L 29/06* (2006.01)
*H04L 9/40* (2022.01)
*H04L 12/46* (2006.01)

(52) U.S. Cl.
CPC .......... *H04L 63/0236* (2013.01); *H04L 63/20* (2013.01)

(58) Field of Classification Search
CPC ............................ H04L 63/0236; H04L 63/20
See application file for complete search history.

(56) References Cited

U.S. PATENT DOCUMENTS

| | | | |
|---|---|---|---|
| 2017/0250869 A1* | 8/2017 | Voellmy | H04L 41/342 |
| 2020/0177494 A1* | 6/2020 | Franzen | H04L 45/20 |
| 2020/0344161 A1* | 10/2020 | Li | H04L 45/34 |

* cited by examiner

*Primary Examiner* — Noura Zoubair
(74) *Attorney, Agent, or Firm* — Harrity & Harrity, LLP

(57) ABSTRACT

A network device may receive an input identifying one or more conditions associated with traversal of packets through a network and one or more actions to be performed if the one or more conditions are satisfied. The network device may transmit, to a path computation element, a request for a label set that satisfies the one or more conditions. The network device may receive the label set from the path computation element. The network device may configure a firewall policy indicating that the one or more actions are to be performed for a packet associated with a label stack that includes the label set.

20 Claims, 13 Drawing Sheets

```
Input {
    condition {
        traversal through node A; AND
        traversal through node B and node E
    }
    action {
        then log;
    }
}
```

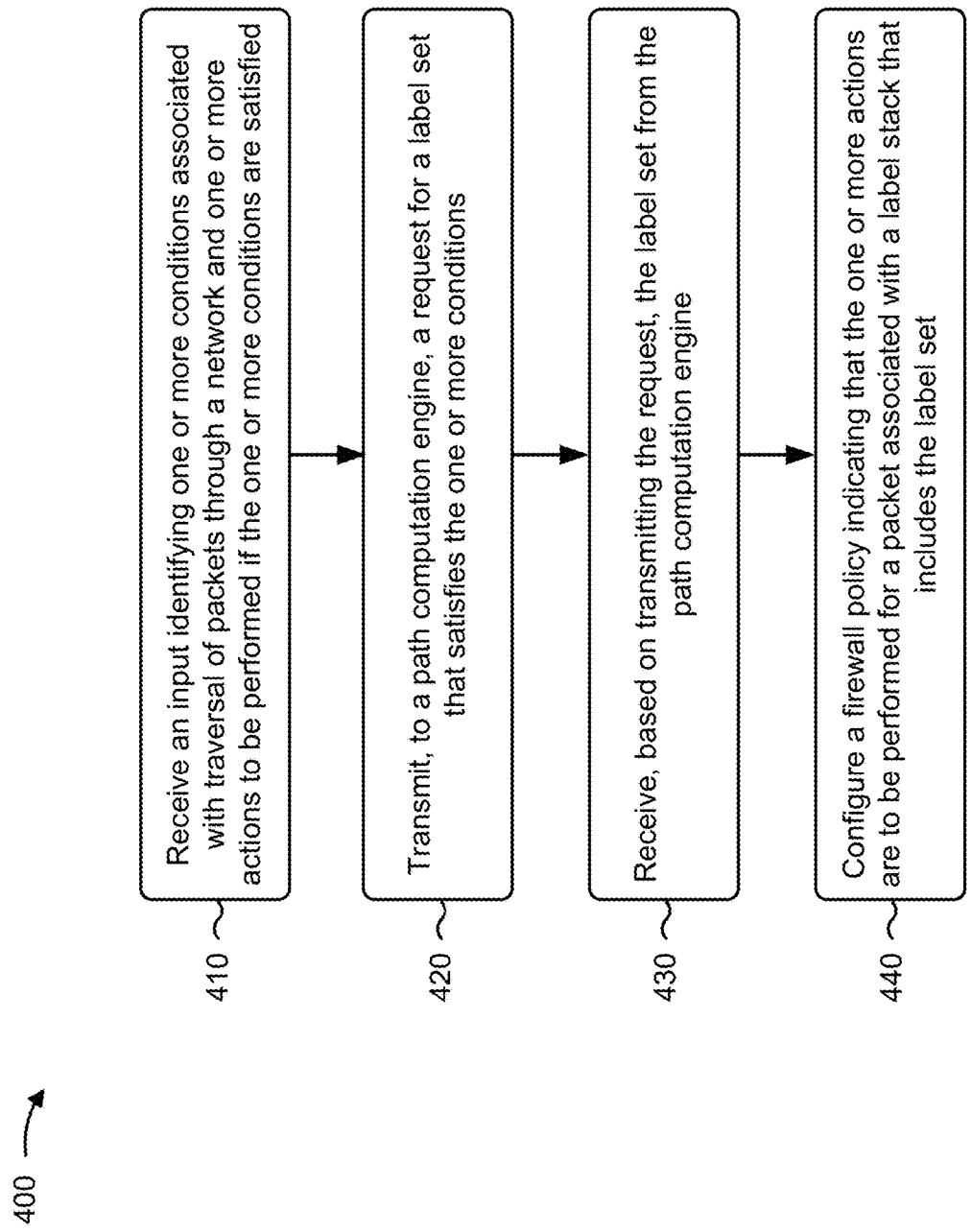

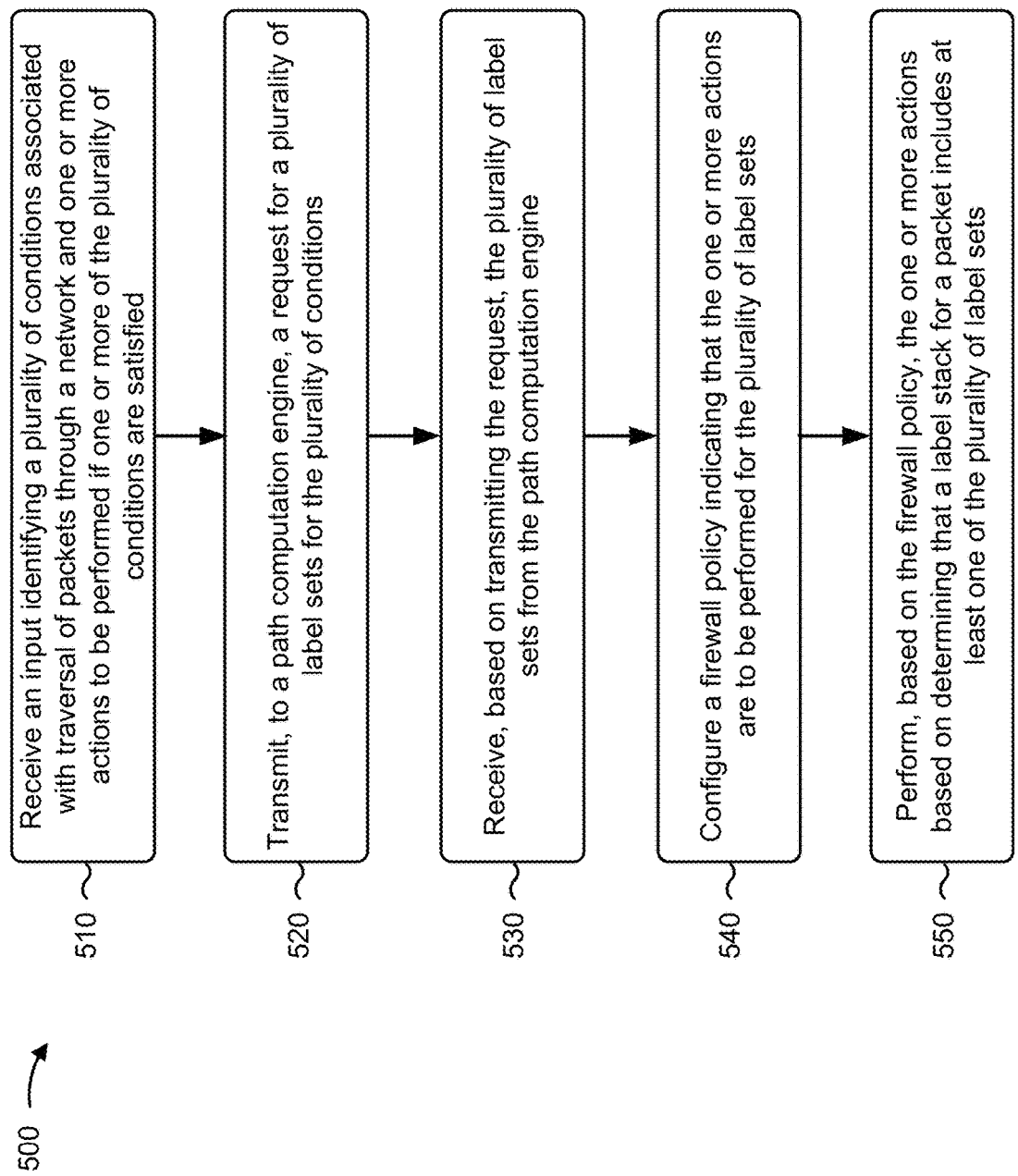

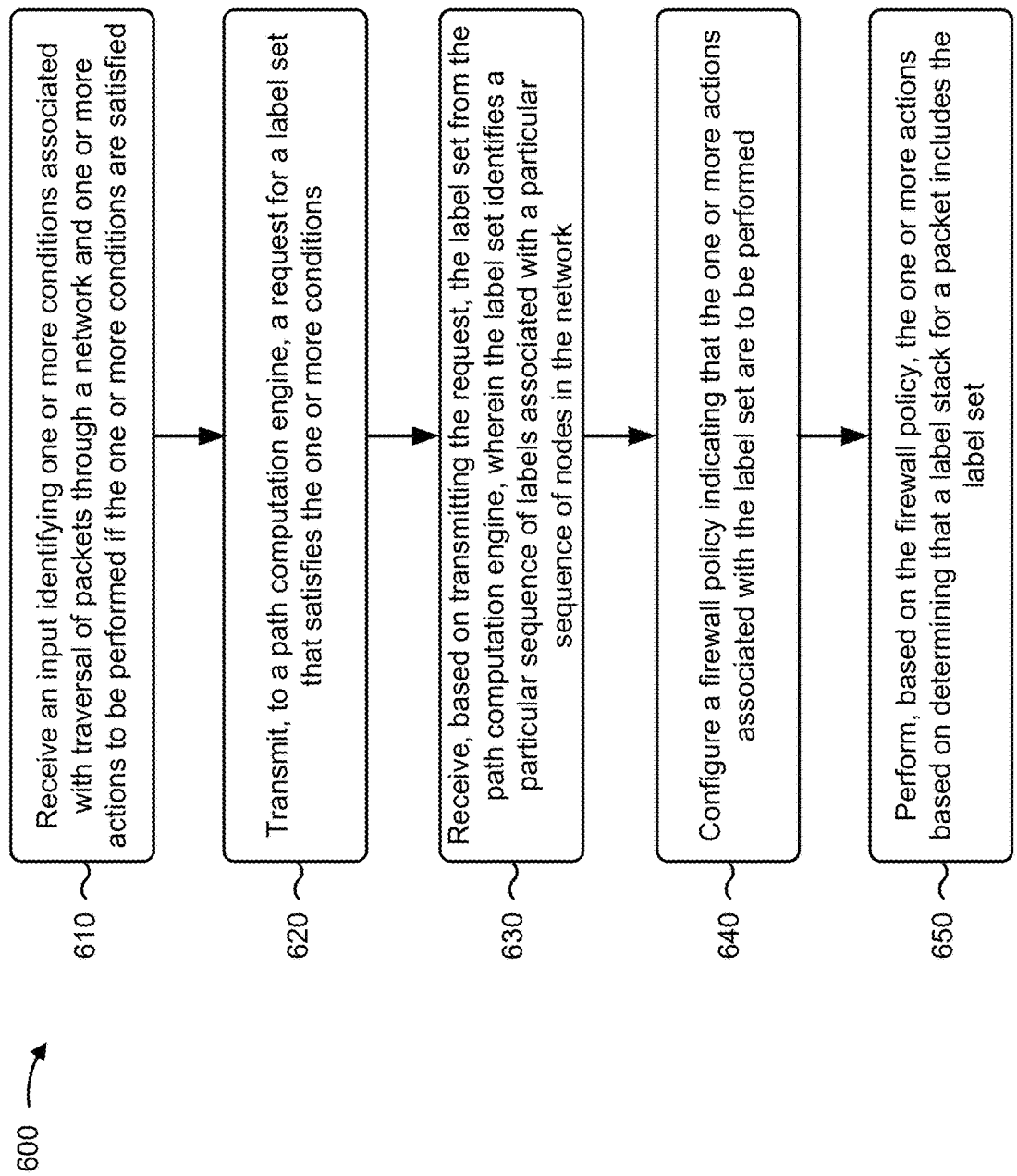

SMART FIREWALL FILTERING IN A LABEL-BASED NETWORK

BACKGROUND

A firewall may include a combination of hardware and software that provides a barrier between trusted devices and/or networks and untrusted devices and/or networks. A firewall device may implement a firewall by monitoring traffic (e.g., to and from an untrusted device and/or network), performing firewall actions on the traffic, applying one more other security actions, and/or the like.

SUMMARY

According to some implementations, a method may include receiving, at a network device, an input identifying one or more conditions associated with traversal of packets through a network and one or more actions to be performed if the one or more conditions are satisfied; transmitting, by the network device and to a path computation element, a request for a label set that satisfies the one or more conditions; receiving, by the network device based on transmitting the request, the label set from the path computation element; and configuring, by the network device, a firewall policy indicating that the one or more actions are to be performed for a packet associated with a label stack that includes the label set.

According to some implementations, a network device may include one or more memories and one or more processors to receive an input identifying a plurality of conditions associated with traversal of packets through a network and one or more actions to be performed if one or more of the plurality of conditions are satisfied; transmit, to a path computation element, a request for a plurality of label sets for the plurality of conditions; receive, based on transmitting the request, the plurality of label sets from the path computation element; configure a firewall policy indicating that the one or more actions are to be performed for the plurality of label sets; and perform, based on the firewall policy, the one or more actions based on determining that a label stack for a packet includes at least one of the plurality of label sets.

According to some implementations, a non-transitory computer-readable medium may store one or more instructions. The one or more instructions, when executed by one or more processors of a network device, may cause the one or more processors to receive an input identifying one or more conditions associated with traversal of packets through a network and one or more actions to be performed if the one or more conditions are satisfied; transmit, to a path computation element, a request for a label set that satisfies the one or more conditions; receive, based on transmitting the request, the label set from the path computation element, wherein the label set identifies a particular sequence of labels associated with a particular sequence of nodes in the network; configure a firewall policy indicating that the one or more actions associated with the label set are to be performed; and perform, based on the firewall policy, the one or more actions based on determining that a label stack for a packet includes the label set.

BRIEF DESCRIPTION OF THE DRAWINGS

FIGS. 1A-1G are diagrams of one or more example implementations described herein.

FIGS. 4-6 are flow charts of example processes for smart firewall filtering in a label-based network.

DETAILED DESCRIPTION

Figure 1A:
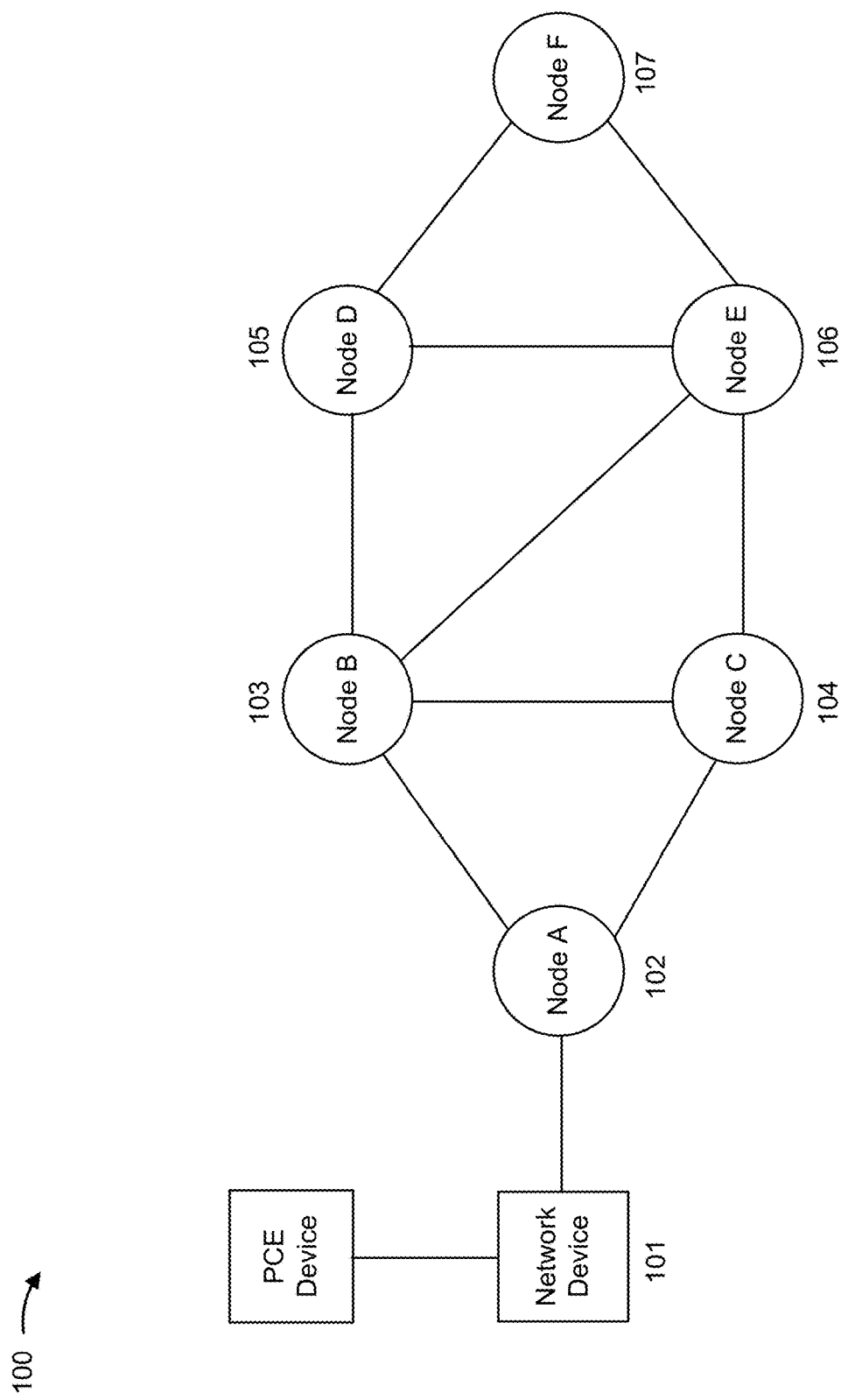

The following detailed description of example implementations refers to the accompanying drawings. The same reference numbers in different drawings may identify the same or similar elements.

A firewall device may perform one or more actions associated with a packet based on a firewall policy. Typically, a firewall policy may be used to perform actions on a packet based on the source of the packet (e.g., the device that generated the packet), the destination of the packet (e.g., the device at which the packet is to terminate), the next hop of the packet (e.g., the next network node to which the firewall device is to forward or route the packet), or the traffic class of the packet. However, the firewall device may be unable to implement a firewall policy to perform actions for packets that are to traverse along a particular path, that are to traverse through a particular set or sequence of network nodes to a destination, that are to traverse through a particular node other than the source, the destination, or the next hop of the packet, and/or the like.

According to some implementations described herein, a network device that implements a firewall for a label-based network, such as a multiprotocol label switching (MPLS) segment routing (SR) network, may be capable of communicating with a path computation element (PCE) of the network to receive label sets. A label set may include a label (e.g., an MPLS label or another type of label) of a particular node in the network, a particular combination of labels of nodes in the network, a particular sequence of labels of nodes in the network, and/or the like. The network device may configure a firewall policy based on a label set, may analyze a label stack of a received packet to determine whether the label stack includes the particular node, the particular combination of labels of nodes, the particular sequence of labels, and/or the like, and may perform one or more actions on the packet based on the determination.

In this way, the firewall functionality of the network device is expanded to include the capability to implement firewall policies based on more than just source, destination, next hop, or traffic class. This permits firewall policies to be configured such that routing of a packet through a particular network segment may be avoided (e.g., such that packets are not routed through a network segment associated with a particular entity, government, country, an untrusted network, and/or the like). Moreover, if the network device is an edge router or another type of edge device that serves as the point of ingress and egress of packets in the network, the network device can also serve as the firewall for the entire network because the network device is capable of implementing firewall policies for paths or links through which packets can traverse in the network. This decreases the complexity of the other nodes in the network because the other nodes do not necessarily need to be equipped with firewall functionalities.

FIGS. 1A-1G are diagrams of one or more example implementations 100 described herein. As shown in FIG. 1A, example implementation(s) 100 may include a plurality of devices, such as a PCE device, a network device, and a plurality of nodes. In some implementations, the PCE device, the network device, and the plurality of nodes may be included in a network, such as a label-based network (e.g., an MPLS SR network and/or the like). In some implementations, the label-based network may include a greater or fewer quantity of nodes.

The nodes (e.g., nodes A through nodes F) may be network devices capable of forwarding and/or routing packets within the network. In some implementations, the nodes may each be assigned a label (e.g., label 102-107) and may be capable of routing packets based on the labels. In this case, a node may receive a packet, may identify the label of the next hop (e.g., the next node) in a label stack of the packet, may remove the label of the next hop from the label stack, and may transmit the packet to the next hop after removing the label of the next hop. The label stack of the packet may include a sequence of labels associated with each node that the packet is to traverse through to reach the destination of the packet. For example, a label stack for a packet that is to traverse from node B, node E, and to node F (e.g., the destination node) may include {106, 107}. The node that is the next hop may receive the packet and perform similar actions, and the nodes may continue this process until the packet reaches the destination node.

The PCE device may be a network device that is capable of performing path computation for the network. For example, the PCE device may compute all of the paths that a packet may traverse from one node to another node in the network, store information identifying the paths, may provide the information identifying the paths to the nodes in the network so that the nodes can use the information to route and/or forward packets in the network, and/or the like.

The network device may be capable of performing firewall functions for packets entering and/or exiting the network. In some implementations, the network device may be a label edge device for the network in that the network device functions as the gateway between the network and other networks such that the network device is a point of ingress and egress for the network. In some implementations, the network device may perform firewall functions by configuring firewall policies, storing the firewall policies at the network device, and applying the firewall policies to packets entering and exiting the network (e.g., to packets traversing through the network device).

Figure 1B:
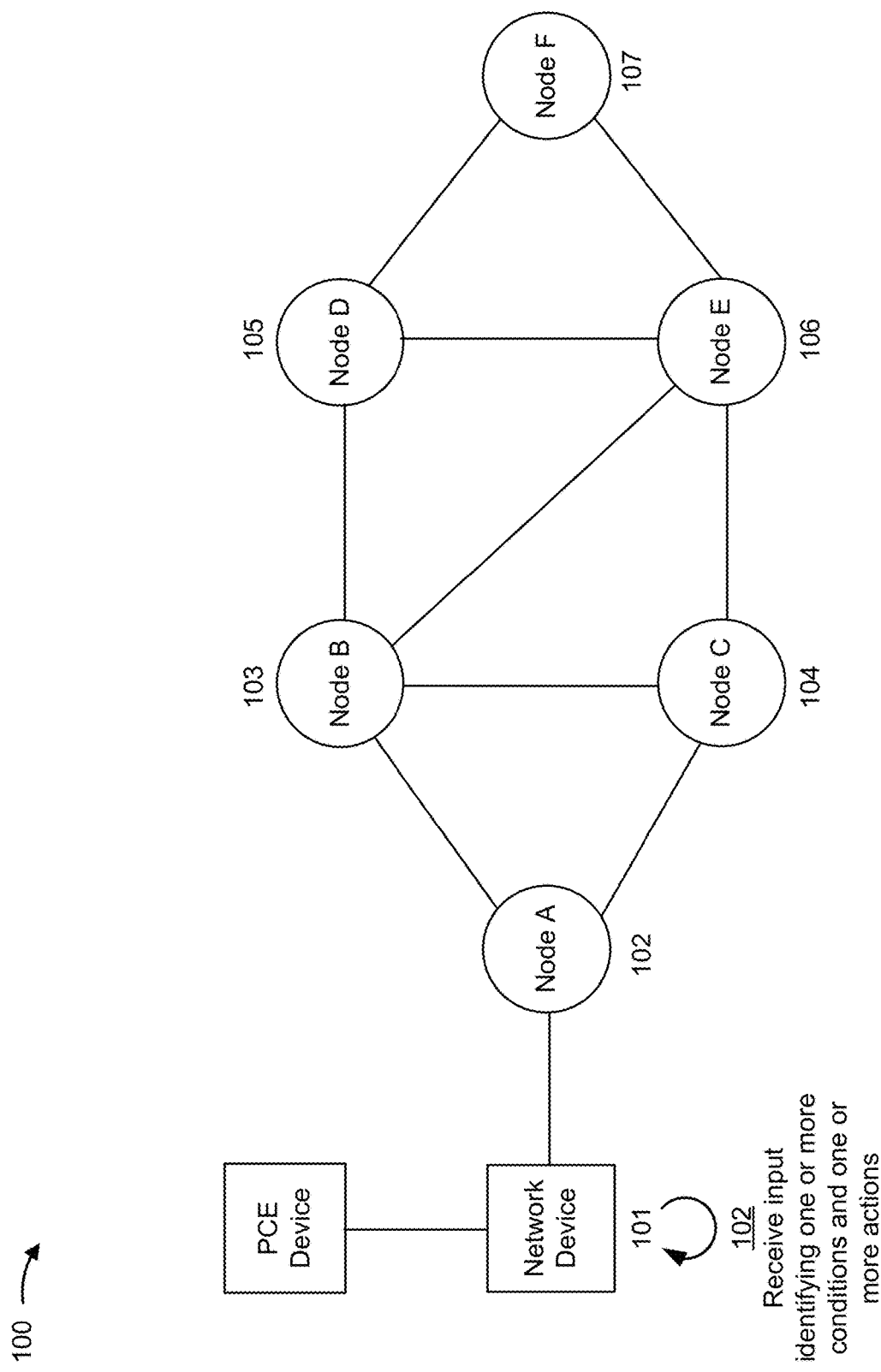

As shown in FIG. 1B, and by reference number 102, the network device may receive an input associated with configuring a firewall policy. The network device may receive the input at the network device via one or more input devices associated with the network device, via a user interface provided by the network device (e.g., a command line interface (CLI), a graphical user interface (GUI), and/or the like), from an application associated with the network device, from an operating system of the network device, and/or the like. In some implementations, the network device may receive the input from a node in the network, from the PCE device, from another device communicatively connected with the network device, and/or the like.

The input may identify one or more conditions associated with traversal of packets through a network, and one or more actions to be performed if the one or more conditions are satisfied. In some implementations, the input may be received in an electronic form, may be received in the form of programming code (e.g., a subroutine or another coding structure), may be received in the form of structured information (e.g., in an extensible markup language (XML) file, a JavaScript object notation (JSON) file, and/or the like), and/or the like.

FIG. 1C illustrates an example of input identifying one or more conditions associated with traversal of packets through two or more nodes in a network and one or more actions to be performed if the one or more conditions are satisfied. Other examples of input may be received and processed by the network device. As shown in FIG. 1C, the one or more actions may include various types of firewall actions, such as logging a packet (e.g., as illustrated in the example in FIG. 1C), saving a packet, performing inspection or deep packet inspection on a packet, dropping or discarding a packet, routing a packet along an intended path, rerouting a packet along another path, counting a packet, and/or the like.

As further shown in FIG. 1C, the one or more conditions may identify a condition associated with a node in the network (e.g., traversal through node A), may identify a condition associated with a particular combination of nodes (e.g., traversal through node B and node E, which may be associated with a link between node B and node E), may identify a condition associated with a particular or specific sequence of nodes, and/or the like. In some implementations, if there are a plurality of links between two nodes (e.g., node B and node E), a condition identifying the combination of the two nodes may further identify a particular link of the plurality of links.

In some implementations, the conditions included in the input may be associated by various logical operators, such as an AND operator as illustrated in the example in FIG. 1C, an OR operator, a NOT operator, an exclusive OR (XOR) operator, as well as other operators. As an example, an AND operator may be used to specify that an action is to be perform if two conditions associated or joined by the AND operator are satisfied. As another example, an OR operator may be used to specify that an action is to be performed if either of two conditions associated or joined by the OR operator are satisfied. As another example, a NOT operator may be used to specify that an action is to be performed only if a first condition is satisfied and not a second condition associated or joined with the first condition by the NOT operator. As another example, an OR operator may be used to specify that an action is to be performed if only one of two conditions associated or joined by the OR operator are satisfied. The capability to specify conditions and operators between conditions enables users and/or other network devices to configure complex, flexible, and specific firewall policies for packets that traverse through the network.

Figure 1D:
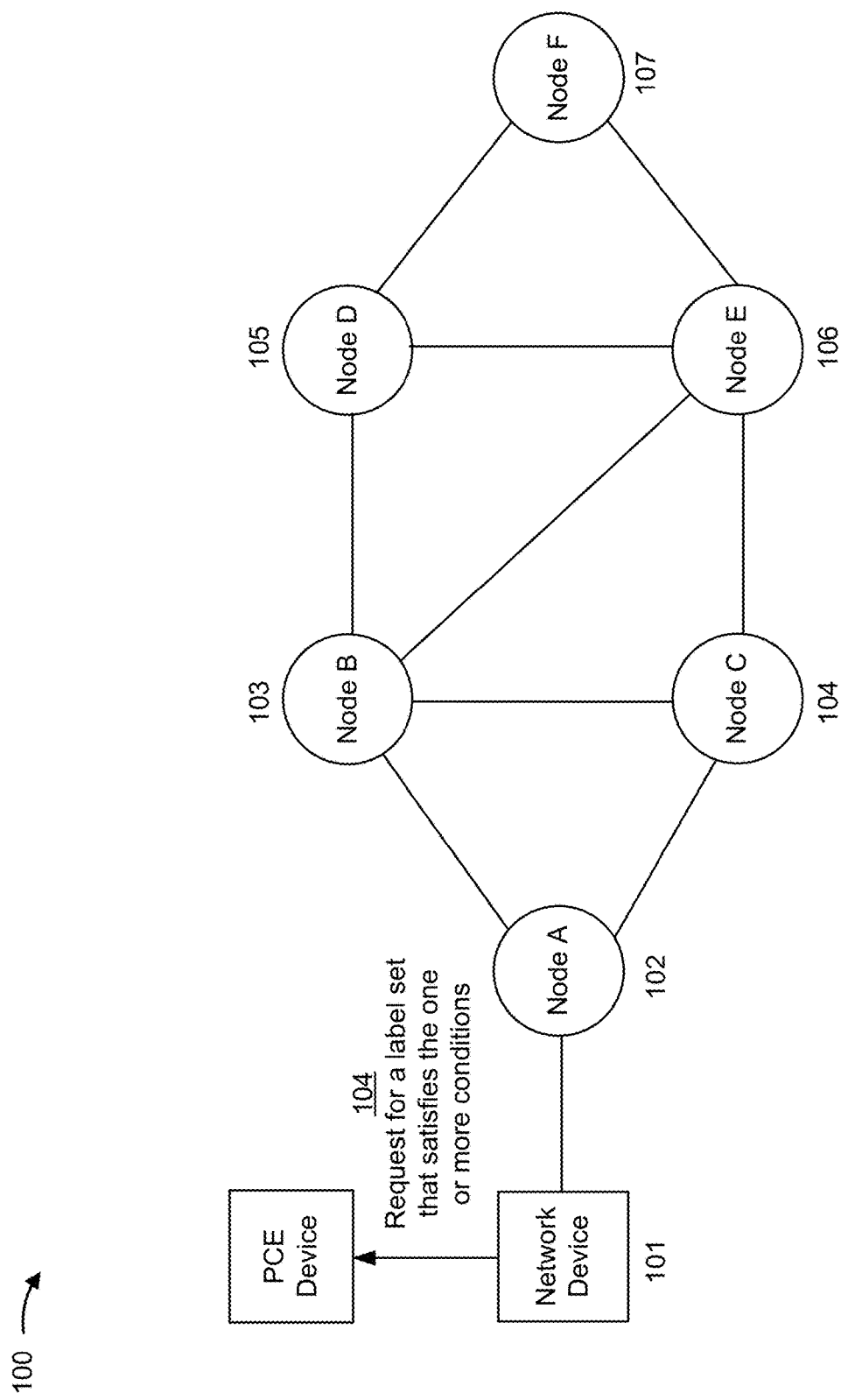

As shown in FIG. 1D, and by reference number 104, the network device may transmit, to the PCE device, a request for a label set that satisfies the one or more conditions indicated in the input received at the network device. In some implementations, the network device may transmit the request to the PCE device based on receiving the input. The input may identify the one or more conditions. In some implementations, a routing engine of the network device may transmit the request to the PCE device. In some implementations, a routing protocol daemon, data plane daemon, or another application of the network device may transmit the request to the PCE device.

The PCE device may receive the request and may process the request by identifying one or more labels based on the one or more conditions, and may generate a label set based on the one or more labels. In this case, the PCE device may identify labels associated with each node identified in the one or more conditions. For example, continuing with the example conditions illustrated in FIG. 1C, the PCE device may identify the labels associated with node A, node B, and node E, which may respectively be 102, 103, and 106. In some implementations, if a condition identifying the combination of the two nodes further identifies a particular link between the two nodes, the PCE device may further identify a label prefix associated with the link along with the labels for the two nodes.

The PCE device may generate the label set such that the labels are configured based on the particular combination of conditions identified in the request. The label set may include one or more labels associated with one or more nodes in the network, may include a combination of a particular set or sequence of labels associated with a particular set or sequence of nodes in the network, and/or the like. For example, the label set for the example conditions illustrated in FIG. 1C may be generated as {{102}, {103, 106}}. In this case a firewall policy for the label set may be configured such that any packet with a label stack that includes label 102 along with the sequence of label 103 adjacent to label 106 in the label stack may be flagged or selected for the actions that are specified in the firewall policy.

Figure 1E:
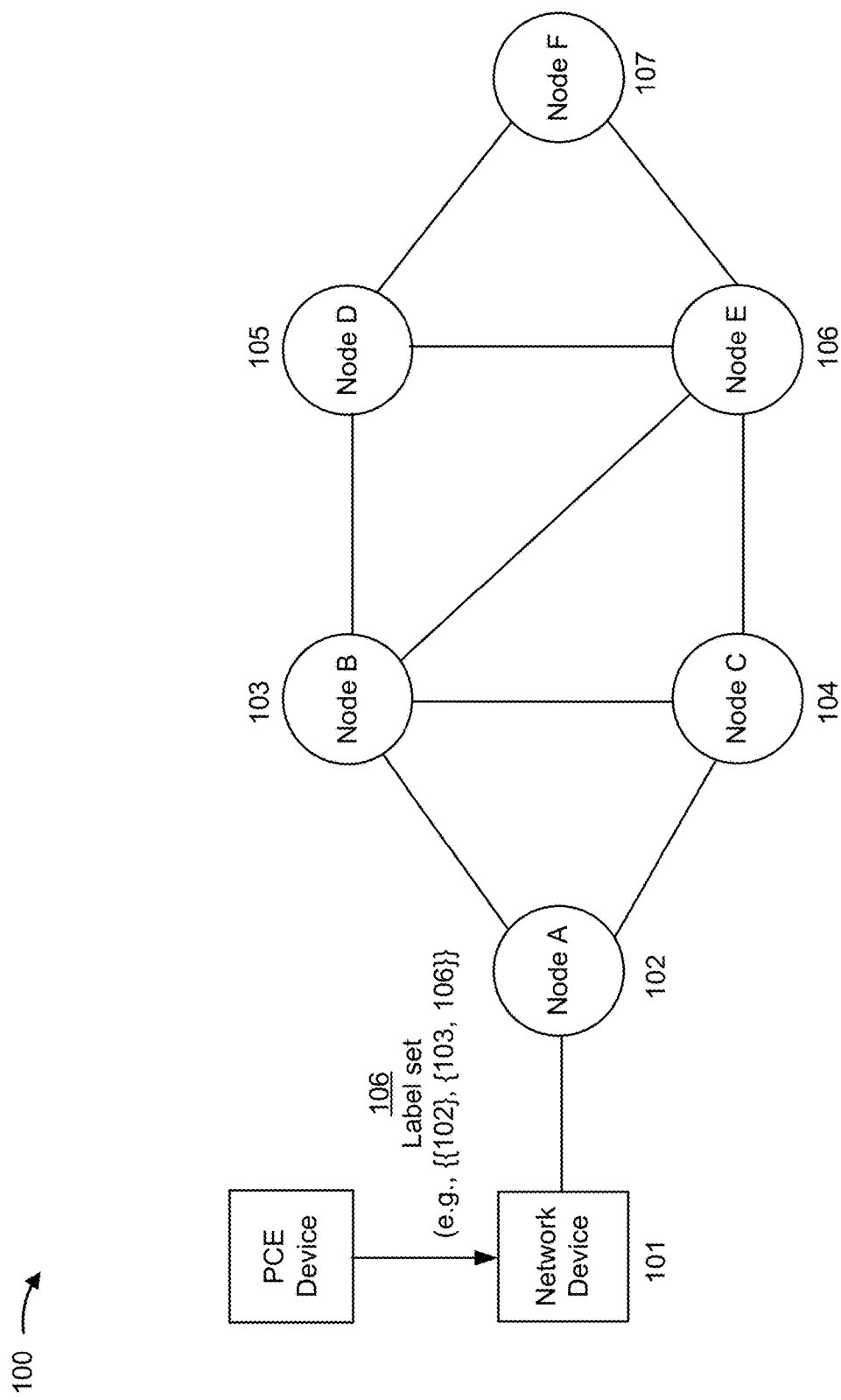

As shown in FIG. 1E, and by reference number 106, the PCE device may transmit the label set (e.g., information identifying the label set) to the network device, and the network device may receive the label set. In some implementations, the PCE device may transmit the label set based on receiving the request, based on generating the label set, and/or the like.

Figure 1F:
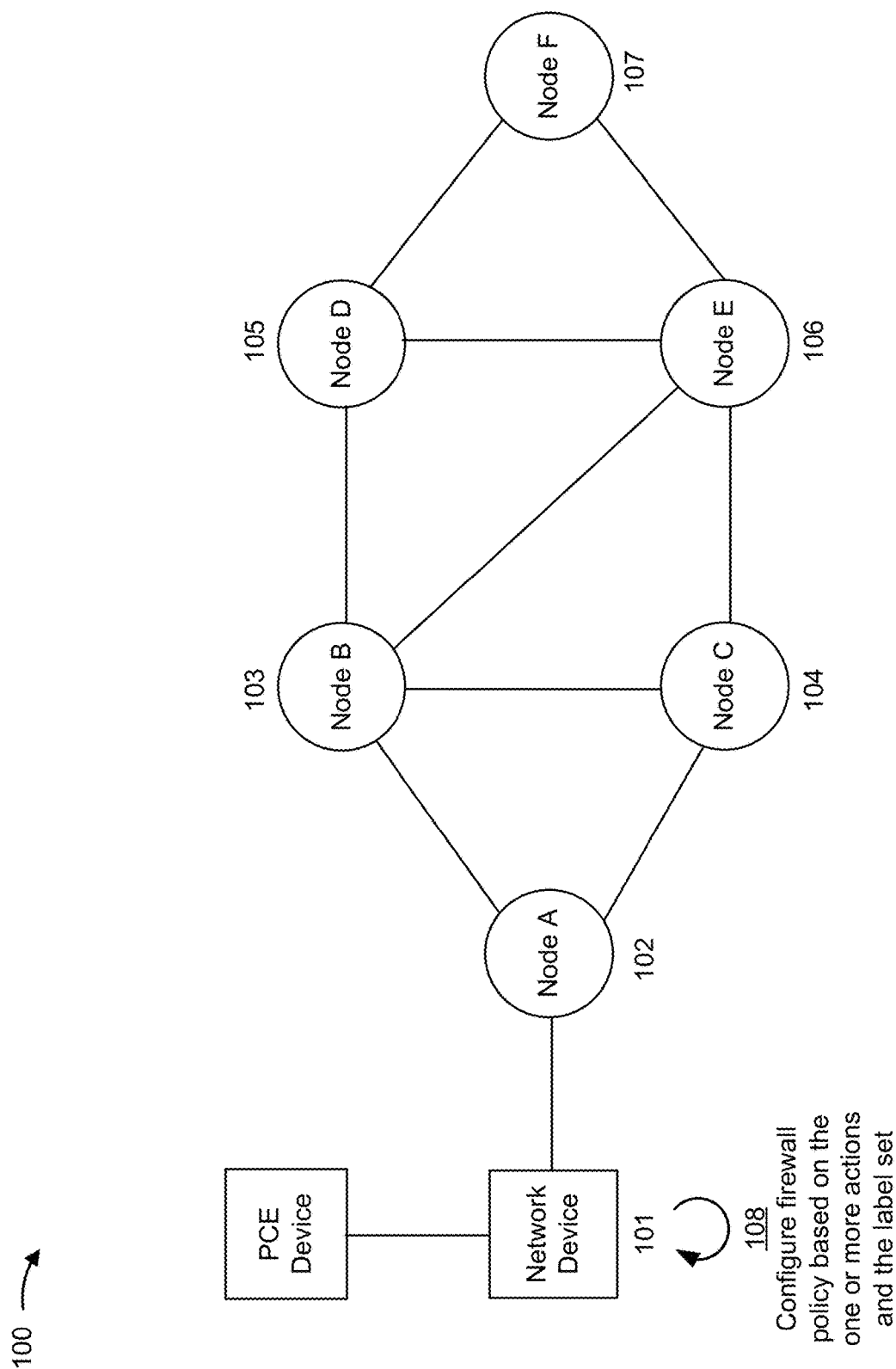

As show in FIG. 1F, and by reference number 108, the network device may configure a firewall policy based on the one or more actions identified in the input received at the network device and based on the label set received from the PCE device. In some implementations, the network device may configure the firewall policy based on receiving the label set from the PCE device and may store the firewall policy at the network device so that the network device may apply the firewall policy to packets traversing through the network device. In some implementations, the network device may configure the firewall policy to indicate that the one or more actions identified in the input are to be performed on a packet based on the label set being identified in a label stack of the packet (e.g., based on the labels and/or particular combinations and/or sequences of labels identified in the label set being included in the label stack of the packet.

In some cases, a label of a node may change over time. For example, the node may be temporarily taken offline (e.g., due to a fault or error with the node, due to scheduled or unscheduled maintenance of the node, due to updates or upgrades being performed for the node, and/or the like), and the node may be brought back online with a different label. In this case, the PCE device may update the calculated paths for the network, may update the label sets generated by the PCE device, and may push or transmit the updated label sets to the network device. The network device may receive the updated label sets, may identify the firewall policies associated with the updated label sets, and may update the firewall policies to include the updated label sets. In this way, the PCE device may permit the network device to automatically update firewall policies based on label changes in the network, which decreases delays in updating firewall policies relative to manually updating the firewall policies, increases the accuracy of the firewall policies, reduces the quantity of packets, and/or the like.

Figure 1G:
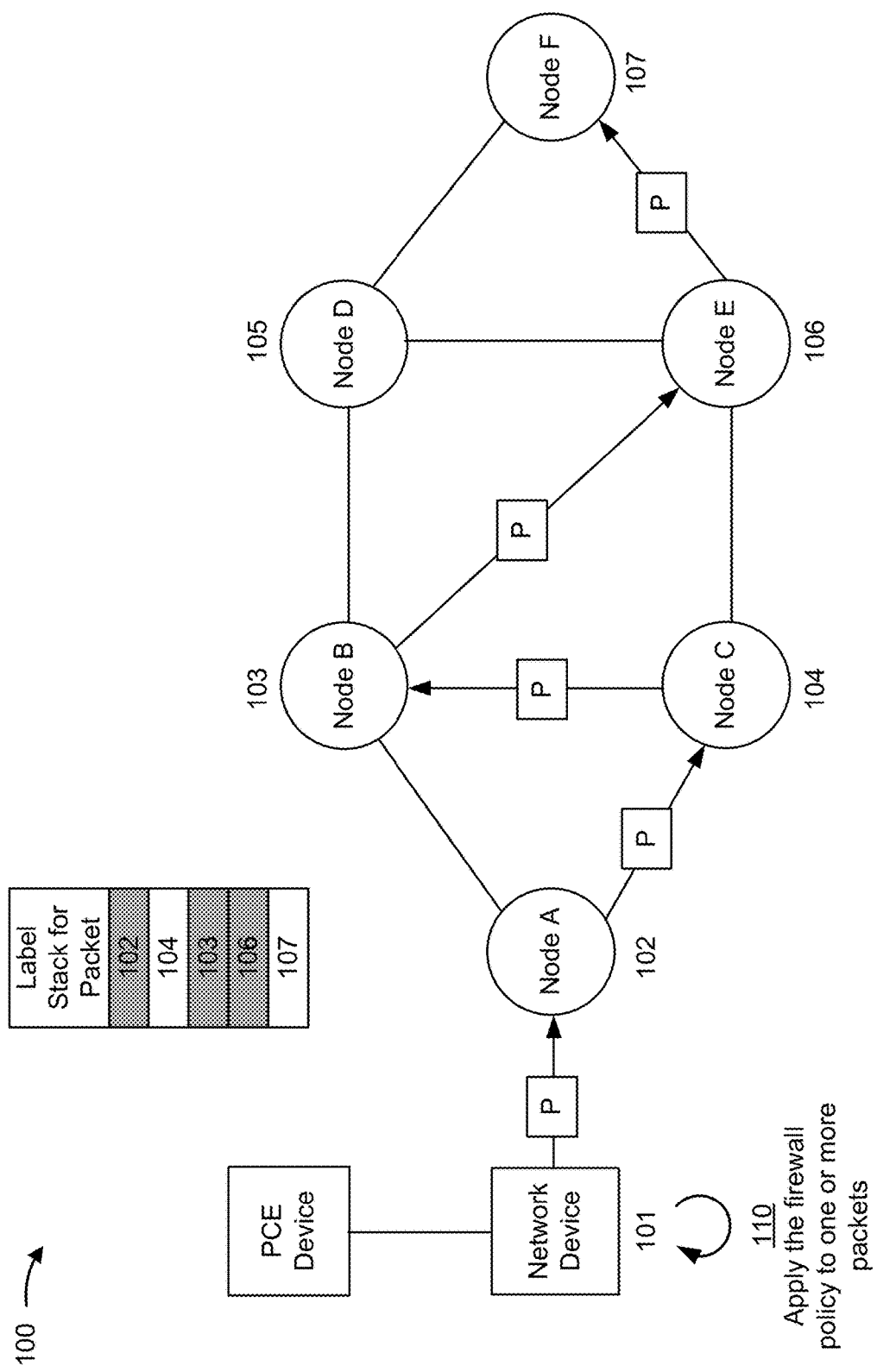

As shown in FIG. 1G, and by reference number 110, the network device may apply the firewall to one or more packets traversing through the network device. As an example, the network device may receive a packet (identified in FIG. 1G as "P") that is to traverse through the network to a destination node F. The network device may identify the label stack for the packet, and may determine that the label stack indicates that the packet is to traverse the network to node F (label 107) through the sequence of node A (label 102), node C (label 104), node B (label 103), and node E (label 106).

The network device may identify the firewall policy that includes label set {{102}, {103, 106}}. The network device may compare the label set and the label stack of the packet to determine if each of the subsets of labels in the label set are included in the label stack of the packet. In the example illustrated in FIG. 1G, the network device may determine that the label stack for the packet includes label 102 and the particular sequence of label 103 to label 106 (e.g., the packet is to traverse through node B to node E along the link between node B and node E. In this case, the network device may determine that the label stack of the packet satisfies the firewall policy (e.g., that the label stack includes the label set), and accordingly may apply the action(s) identified in the firewall policy to the packet, which may include any of the actions described above and/or other actions.

In this way, the network device may configure a firewall policy based on a label set, may analyze a label stack of a received packet to determine whether the label stack includes the particular node, the particular combination of labels of nodes, the particular sequence of labels, and/or the like, and may perform one or more actions on the packet based on the determination. This permits the firewall functionality of the network device to be expanded to include the capability to implement firewall policies based on more than just source, destination, next hop, or traffic class. This permits firewall policies to be configured such that routing of a packet through a particular network segment may be avoided (e.g., such that packets are not routed through a network segment associated with a particular entity, government, country, an untrusted network, and/or the like). Moreover, if the network device is an edge router or another type of edge device that serves as the point of ingress and egress of packets in the network, the network device can also serve as the firewall for the entire network because the network device is capable of implementing firewall policies for paths or links through which packets can traverse in the network. This decreases the complexity of the other nodes in the network because the other nodes do not necessarily need to be equipped with firewall functionalities.

As indicated above, FIGS. 1A-1G are provided merely as one or more examples. Other examples may differ from what is described with regard to FIGS. 1A-1G.

Figure 2:
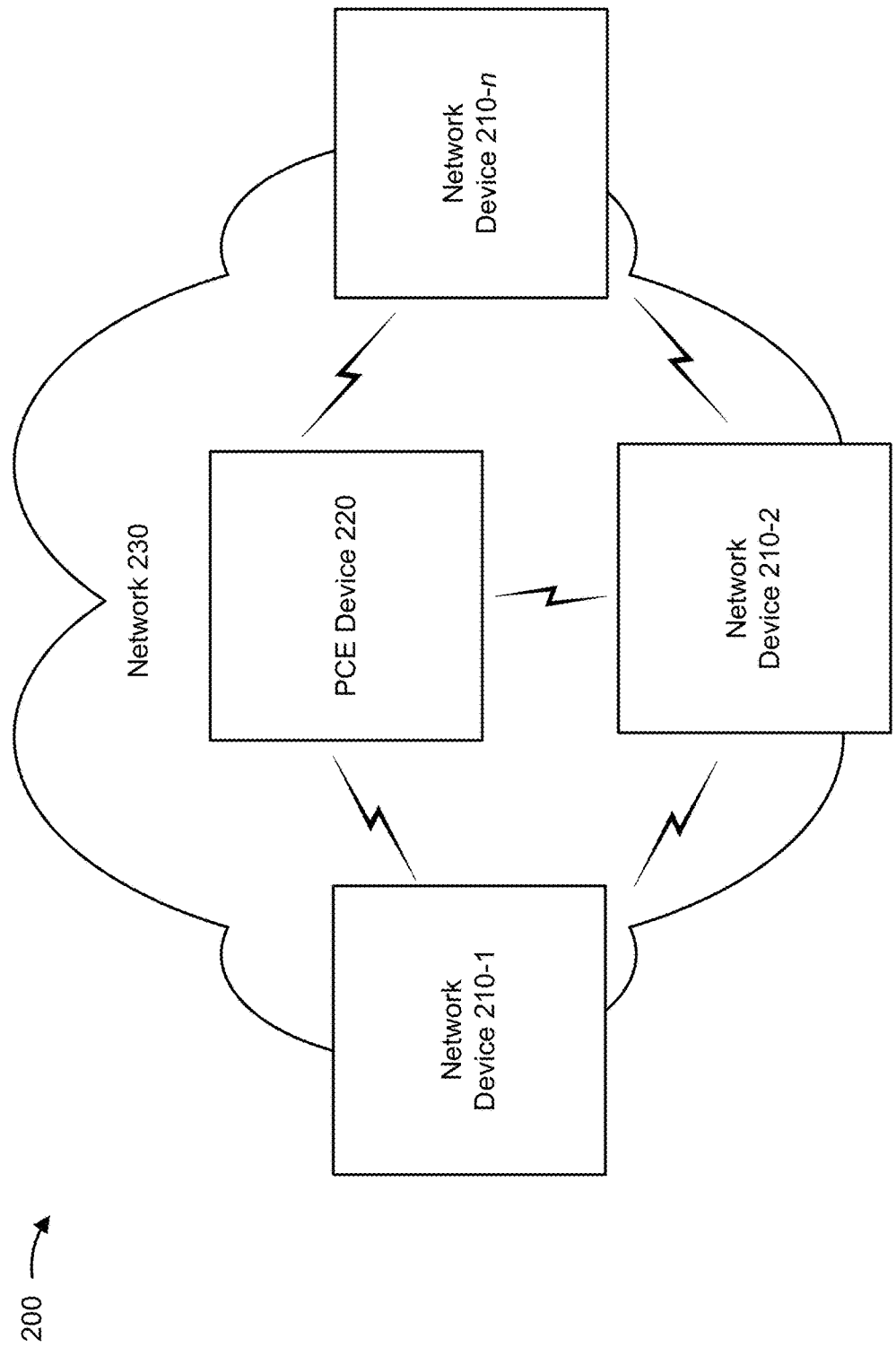
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network devices 210-1 through 210-n (n≥1) (hereinafter referred to collectively as "network devices 210," and individually as "network device 210"), a PCE device 220, and a network 230. Devices of environment 200 may interconnect via wired connections, wireless connections, or a combination of wired and wireless connections.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center.

In some implementations, a network device 210 may be a node capable of forwarding and/or routing packets within network 230. In some implementations, a network device 210 may be a node capable of routing packets within network 230 based on labels (e.g., MPLS labels and/or other types of labels). In some implementations, a network device 210 may be configured to perform firewall functions for network 230, such as applying firewall policies to packets. In some implementations, a network device 210 may be capable of receiving an input identifying one or more conditions associated with traversal of packets through network 230 and one or more actions to be performed if the one or more conditions are satisfied, may be capable of transmitting, to PCE device 220, a request for a label set that satisfies the one or more conditions, may be capable of receiving the label set from PCE device 220, may be capable of configuring a firewall policy indicating that the one or more actions are to be performed for a packet associated with a label stack that includes the label set, and/or the like.

In some implementations, PCE device 220 includes one or more devices capable of receiving, providing, storing, generating, and/or processing information. In some implementations, PCE device 220 may include a firewall, a router, a server, a desktop computer, a laptop computer, a data center, a cloud-implemented platform, and/or the like. In some implementations, PCE device 220 may be capable of receiving, from a network device 210, a request for a label set, may be capable of identifying labels based on one or more conditions identified in the request, may be capable of generating the label set to include the labels based on the one or more conditions, may be capable of transmitting the label set to the network device 210, may be capable of updating label sets and transmitting updated label sets to the network device 210, and/or the like.

Network 230 includes one or more wireless networks. For example, network 230 may include a cellular network (e.g., a long-term evolution (LTE) network, a code division multiple access (CDMA) network, a 3G network, a 4G network, a 5G network, another type of cellular network, and/or the like), a wireless local area network (WLAN) (e.g., a Wi-Fi network, an unlicensed spectrum wireless network, and/or the like), a wireless peer-to-peer (P2P) network (e.g., Wi-Fi direct, Bluetooth, and/or the like), and/or the like, and/or a combination of these or other types of networks. In some implementations, network 230 may be a label-based network, such as an MPLS SR network and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
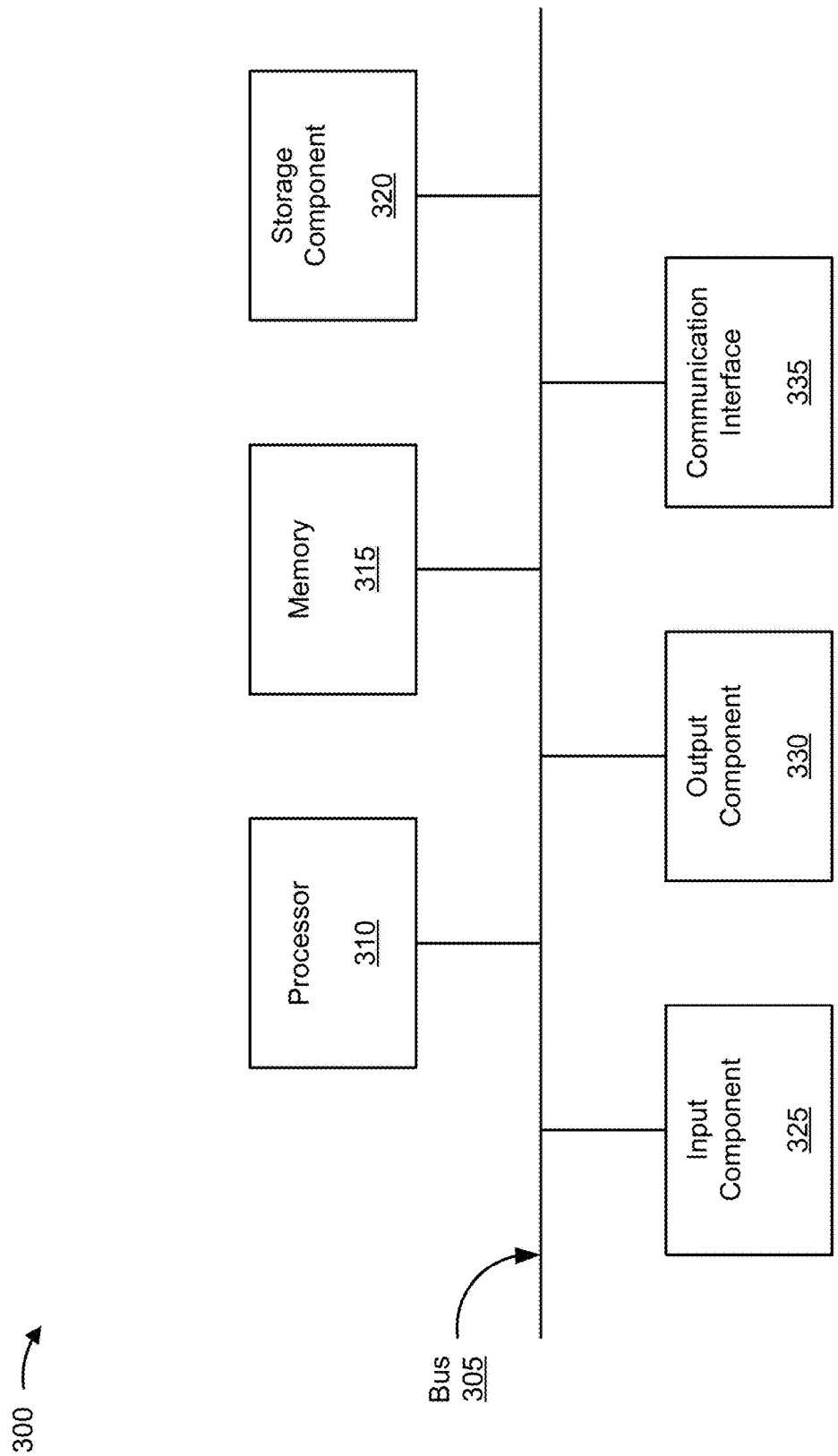
FIGS. 3A and 3B are diagrams of example components of one or more devices of FIG. 2.
Figure 3B:
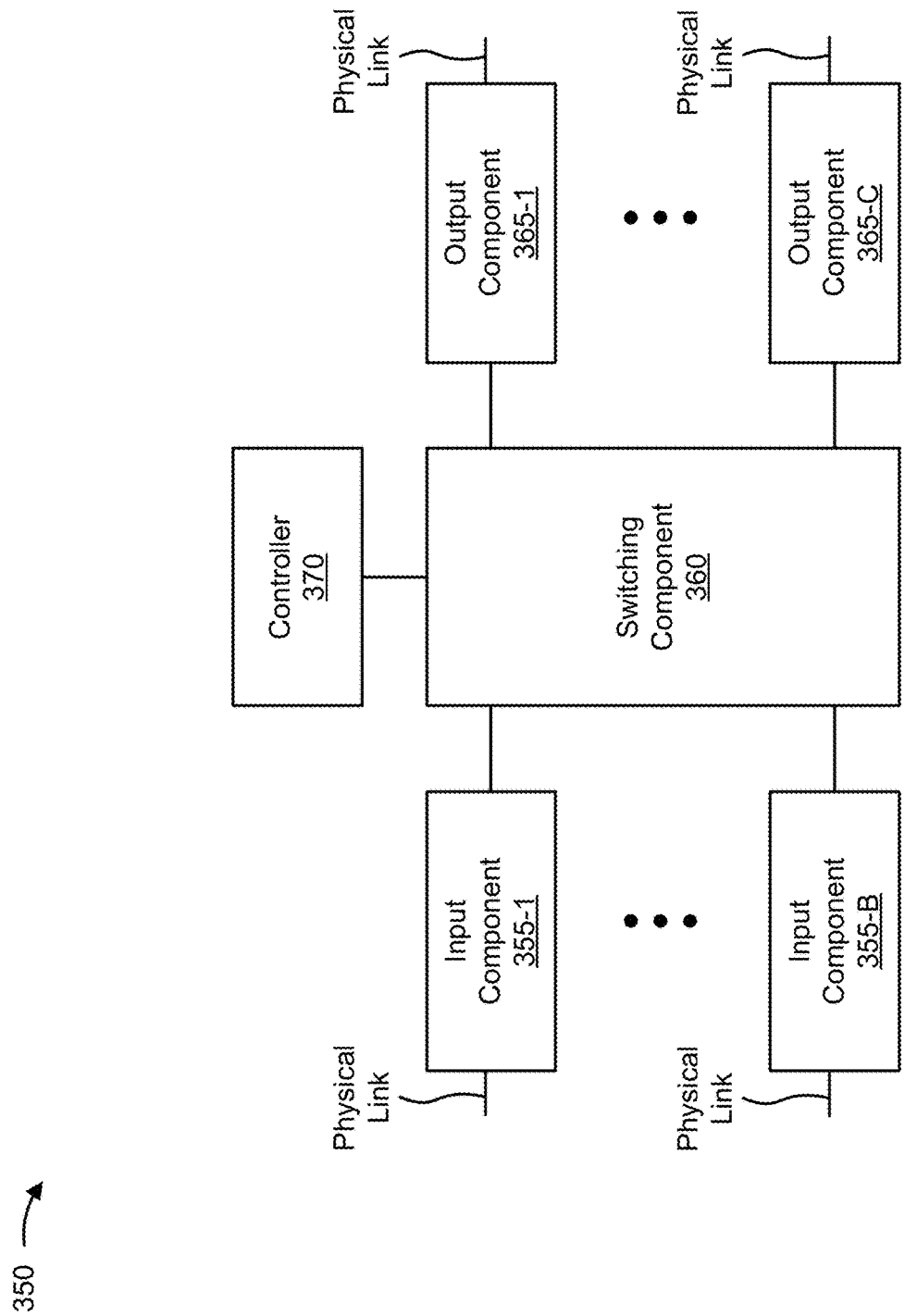

FIGS. 3A and 3B are diagrams of example components of one or more devices of FIG. 2. FIG. 3A is a diagram of example components of a device 300. In some implementations, device 300 may correspond to network device 210 and/or PCE device 220. In some implementations, network device 210 and/or PCE device 220 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. In some implementations, device 350 may correspond to network device 210 and/or PCE device 220. In some implementations, network device 210 and/or PCE device 220 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C(C≥1) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via buses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., an input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, and/or the like) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A "computer-readable medium" as used herein is a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B.

FIG. 4 is a flow chart of an example process 400 for smart firewall filtering in a label-based network. In some implementations, one or more process blocks of FIG. 4 may be performed by a network device (e.g., network device 210, device 300, device 350, and/or the like). In some implementations, one or more process blocks of FIG. 4 may be performed by another device or a group of devices separate from or including the network device, such as a PCE device (e.g., PCE device 220).

As shown in FIG. 4, process 400 may include receiving an input identifying one or more conditions associated with traversal of packets through a network and one or more actions to be performed if the one or more conditions are satisfied (block 410). For example, the network device (e.g., using processor 310, memory 315, storage component 320, input component 325, output component 330, communication interface 335, input component 355, switching component 360, output component 365, controller 370, and/or the like) may receive, at a network device, an input identifying a plurality of conditions associated with traversal of packets through two or more nodes in a network and one or more actions to be performed if one or more of the plurality of conditions are satisfied, as described above.

As further shown in FIG. 4, process 400 may include transmitting, to a path computation element, a request for a label set that satisfies the one or more conditions (block 420). For example, the network device (e.g., using processor 310, memory 315, storage component 320, input component 325, output component 330, communication interface 335, input component 355, switching component 360, output component 365, controller 370, and/or the like) may transmit, to a path computation element, a request for a label set that satisfies the one or more conditions, as described above.

As further shown in FIG. 4, process 400 may include receiving the label set from the path computation element (block 430). For example, the network device (e.g., using processor 310, memory 315, storage component 320, input component 325, output component 330, communication interface 335, input component 355, switching component 360, output component 365, controller 370, and/or the like) may receive the label set from the path computation element, as described above.

As further shown in FIG. 4, process 400 may include configuring a firewall policy indicating that the one or more actions are to be performed for a packet associated with a label stack that includes the label set (block 440). For example, the network device (e.g., using processor 310, memory 315, storage component 320, input component 325, output component 330, communication interface 335, input component 355, switching component 360, output component 365, controller 370, and/or the like) may configure a firewall policy indicating that the one or more actions are to be performed for a packet associated with a label stack that includes the label set, as described above.

Process 400 may include additional implementations, such as any single implementation or any combination of implementations described below and/or in connection with one or more other processes described elsewhere herein.

In a first implementation, the one or more conditions comprise a condition that the packet traverses along a path to a destination node through a particular sequence of nodes included in the path, and the label set identifies a particular sequence of labels associated with the particular sequence of nodes. In a second implementation, alone or in combination with the first implementation, the one or more actions comprise at least one of logging the packet, saving the packet, performing deep packet inspection on the packet, or dropping or discarding the packet.

In a third implementation, alone or in combination with one or more of the first and second implementations, the one or more conditions comprise a first condition associated with one or more first nodes in the network, and a second condition associated with one or more second nodes in the network, the first condition and the second condition being associated by an AND operator. In a fourth implementation, alone or in combination with one or more of the first through third implementations, process 400 includes receiving an updated label set from the path computation element and updating the firewall policy to include the updated label set.

In a fifth implementation, alone or in combination with one or more of the first through fourth implementations, the label set comprises a first label associated with a first node in the network, and a combination of a particular sequence of labels that comprises: a second label associated with a second network node in the network, and a third label associated with a third network node in the network. In a sixth implementation, alone or in combination with one or more of the first through fifth implementations, the network device is a label edge router for the network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for smart firewall filtering in a label-based network. In some implementations, one or more process blocks of FIG. 5 may be performed by a network device (e.g., network device 210, device 300, device 350, and/or the like). In some implementations, one or more process blocks of FIG. 5 may be performed by another device or a group of devices separate from or including the network device, such as a PCE device (e.g., PCE device 220).

As shown in FIG. 5, process 500 may include receiving an input identifying a plurality of conditions associated with traversal of packets through a network and one or more actions to be performed if one or more of the plurality of conditions are satisfied (block 510). For example, the network device (e.g., using processor 310, memory 315, storage component 320, input component 325, output component 330, communication interface 335, input component 355, switching component 360, output component 365, controller 370, and/or the like) may receive an input identifying a plurality of conditions associated with traversal of packets through a network and one or more actions to be performed if one or more of the plurality of conditions are satisfied, as described above.

As further shown in FIG. 5, process 500 may include transmitting, to a path computation element, a request for a plurality of label sets for the plurality of conditions (block 520). For example, the network device (e.g., using processor 310, memory 315, storage component 320, input component 325, output component 330, communication interface 335, input component 355, switching component 360, output component 365, controller 370, and/or the like) may transmit, to a path computation element, a request for a plurality of label sets for the plurality of conditions, as described above.

As further shown in FIG. 5, process 500 may include receiving, based on transmitting the request, the plurality of label sets from the path computation element (block 530). For example, the network device (e.g., using processor 310, memory 315, storage component 320, input component 325, output component 330, communication interface 335, input component 355, switching component 360, output component 365, controller 370, and/or the like) may receive, based on transmitting the request, the plurality of label sets from the path computation element, as described above.

As further shown in FIG. 5, process 500 may include configuring a firewall policy indicating that the one or more actions are to be performed for the plurality of label sets (block 540). For example, the network device (e.g., using processor 310, memory 315, storage component 320, input component 325, output component 330, communication interface 335, input component 355, switching component 360, output component 365, controller 370, and/or the like) may configure a firewall policy indicating that the one or more actions are to be performed for the plurality of label sets, as described above.

As further shown in FIG. 5, process 500 may include performing, based on the firewall policy, the one or more actions based on determining that a label stack for a packet includes at least one of the plurality of label sets (block 550). For example, the network device (e.g., using processor 310, memory 315, storage component 320, input component 325, output component 330, communication interface 335, input component 355, switching component 360, output component 365, controller 370, and/or the like) may perform, based on the firewall policy, the one or more actions based on determining that a label stack for a packet includes at least one of the plurality of label sets, as described above.

Process 500 may include additional implementations, such as any single implementation or any combination of implementations described below and/or in connection with one or more other processes described elsewhere herein.

In a first implementation, the network is an MPLS SR network. In a second implementation, alone or in combination with the first implementation, the network device is a label edge router for the network. In a third implementation, alone or in combination with one or more of the first and second implementations, process 500 includes receiving an update to a label set of the plurality of label sets from the path computation element, wherein the update identifies that a label included in the label set has changed; and updating the firewall policy based on the update to the label set.

In a fourth implementation, alone or in combination with one or more of the first through third implementations, receiving the input includes receiving the input from another network device, receiving the input via a command line interface of the network device, or receiving the input from an application associated with the network device. In a fifth implementation, alone or in combination with one or more of the first through fourth implementations, the one or more conditions comprise a first condition associated with one or more first nodes in the network, a second condition associated with one or more second nodes in the network, and a third condition associated with one or more third nodes in the network, and the first condition, the second condition, and the third condition are associated by a plurality of OR operators. In a sixth implementation, alone or in combination with one or more of the first through fifth implementations, the plurality of label sets comprise a first label set associated with the first condition, a second label set associated with the second condition, and a third label set associated with the third condition.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for smart firewall filtering in a label-based network. In some implementations, one or more process blocks of FIG. 6 may be performed by a network device (e.g., network device 210, device 300, device 350, and/or the like). In some implementations, one or more process blocks of FIG. 6 may be performed by another device or a group of devices separate from or including the network device, such as a PCE device (e.g., PCE device 220).

As shown in FIG. 6, process 600 may include receiving an input identifying one or more conditions associated with traversal of packets through a network and one or more actions to be performed if the one or more conditions are satisfied (block 610). For example, the network device (e.g., using processor 310, memory 315, storage component 320, input component 325, output component 330, communication interface 335, input component 355, switching component 360, output component 365, controller 370, and/or the like) may receive an input identifying a plurality of conditions associated with traversal of packets through a network and one or more actions to be performed if one or more of the plurality of conditions are satisfied, as described above.

As further shown in FIG. 6, process 600 may include transmitting, to a path computation element, a request for a label set that satisfies the one or more conditions (block 620). For example, the network device (e.g., using processor 310, memory 315, storage component 320, input component 325, output component 330, communication interface 335, input component 355, switching component 360, output component 365, controller 370, and/or the like) may transmit, to a path computation element, a request for a label set that satisfies the one or more conditions, as described above.

As further shown in FIG. 6, process 600 may include receiving, based on transmitting the request, the label set from the path computation element, wherein the label set identifies a particular sequence of labels associated with a particular sequence of nodes in the network (block 630). For example, the network device (e.g., using processor 310, memory 315, storage component 320, input component 325, output component 330, communication interface 335, input component 355, switching component 360, output component 365, controller 370, and/or the like) may receive, based on transmitting the request, the label set from the path computation element, as described above. In some implementations, the label set identifies a particular sequence of labels associated with a particular sequence of nodes in the network.

As further shown in FIG. 6, process 600 may include configuring a firewall policy indicating that the one or more actions associated with the label set are to be performed (block 640). For example, the network device (e.g., using processor 310, memory 315, storage component 320, input component 325, output component 330, communication interface 335, input component 355, switching component 360, output component 365, controller 370, and/or the like) may configure a firewall policy indicating that the one or more actions associated with the label set are to be performed, as described above.

As further shown in FIG. 6, process 600 may include performing, based on the firewall policy, the one or more actions based on determining that a label stack for a packet includes the label set (block 650). For example, the network device (e.g., using processor 310, memory 315, storage component 320, input component 325, output component 330, communication interface 335, input component 355, switching component 360, output component 365, controller 370, and/or the like) may perform, based on the firewall policy, the one or more actions based on determining that a label stack for a packet includes the label set, as described above.

Process 600 may include additional implementations, such as any single implementation or any combination of implementations described below and/or in connection with one or more other processes described elsewhere herein.

In a first implementation, the one or more actions comprise at least one of routing the packet along an intended path, rerouting the packet along another path, or counting the packet. In a second implementation, alone or in combination with the first implementation, receiving the input includes receiving the input from another network device, receiving the input via a command line interface of the network device, or receiving the input from an application associated with the network device. In a third implementation, alone or in combination with one or more of the first and second implementations, process 600 includes receiving an updated label set from the path computation element, and updating the firewall policy to include the updated label set.

In a fourth implementation, alone or in combination with one or more of the first through third implementations, the network is an MPLS SR network. In a fifth implementation, alone or in combination with one or more of the first through fourth implementations, the one or more conditions comprise: a first condition associated with one or more first nodes in the network, a second condition associated with one or more second nodes in the network, and a third condition associated with one or more third nodes in the network, the first condition and the second condition are associated by an AND operator, and the third condition is associated with the first condition and the second condition by a NOT operator.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, at a network device, an input identifying:
      one or more conditions associated with traversal of packets through a network,
         wherein the one or more conditions comprise:
            a first condition that a packet, of the packets, traverses along a path to a destination node through a particular sequence of nodes included in the path, and
            a second condition that the packet is routed to avoid a network segment that includes a particular untrusted network, and
      one or more actions, associated with a firewall policy, to be performed if the one or more conditions are satisfied;
   transmitting, by the network device and to a path computation element, a request for a label set, that includes one or more subsets of labels, that satisfies the one or more conditions,
      wherein the label set identifies a particular sequence of labels associated with the particular sequence of nodes in the network;
   receiving, by the network device and from the path computation element, the label set based on transmitting the request;
   identifying, by the network device, a label stack of the packet that includes the label set;
   comparing, by the network device, the label set and the label stack of the packet to determine if one or more subsets of labels in the label set are included in the label stack of the packet;

determining, by the network device, that the label stack of the packet satisfies the firewall policy based on comparing the label set and the label stack of the packet;

performing, by the network device, the one or more actions based on determining that the label stack of the packet satisfies the firewall policy, wherein the one or more actions are associated with the packet;

receiving, by the network device and from the path computation element, an updated label set based on changes in the network; and automatically updating, by the network device, the firewall policy to include the updated label set.

2. The method of claim 1, wherein the one or more actions comprise at least one of:
logging the packet,
saving the packet,
performing deep packet inspection on the packet, or
dropping or discarding the packet.

3. The method of claim 1, wherein the one or more conditions comprise:
a first condition associated with one or more first nodes in the network, and
a second condition associated with one or more second nodes in the network,
wherein the first condition and the second condition are associated by an AND operator.

4. The method of claim 1, wherein the label set comprises:
a first label associated with a first node in the network, and
a combination of a particular sequence of labels that comprises:
a second label associated with a second node in the network, and
a third label associated with a third node in the network.

5. The method of claim 1, wherein the device is a label edge router for the network.

6. The method of claim 1, further comprising:
identifying one or more labels associated with each node identified in the one or more conditions;
generating a label set based on the one or more labels; and
wherein transmitting the request for the label set that satisfies the one or more conditions comprises:
transmitting the request for the label set,
wherein the label set is based on the one or more labels.

7. The method of claim 1, wherein receiving the input comprises:
receiving the input via a command line interface of the network device.

8. A network device, comprising:
one or more memories; and
one or more processors, to:
receive an input identifying:
a plurality of conditions associated with traversal of packets through a network,
wherein the plurality of conditions comprise:
a first condition that a packet, of the packets, traverses along a path to a destination node through a particular sequence of nodes included in the path, and
a second condition that the packet is routed to avoid a network segment that includes a particular untrusted network; and
one or more actions, associated with a firewall policy, to be performed if one or more of the plurality of conditions are satisfied;

transmit, to a path computation element, a request for a label set, that includes one or more subsets of labels, for the plurality of conditions,
wherein the label set identifies a particular sequence of labels associated with the particular sequence of nodes in the network;
receive, from the path computation element and based on transmitting the request, the label set;
identify a label stack of the packet that includes the label set;
compare the label set and the label stack of the packet to determine if one or more subset of labels in the label set are included in the label stack of the packet;
determine that the label stack of the packet satisfies the firewall policy based on comparing the label set and the label stack of the packet;
perform the one or more actions based on determining that the label stack of the packet satisfies the firewall policy, wherein the one or more actions are associated with the packet;
receive, from the path computation element, an updated label set based on changes in the network; and
automatically update the firewall policy to include the updated label set.

9. The network device of claim 8, wherein the network is a multiprotocol label switching segment routing network.

10. The network device of claim 8, wherein the network device is a label edge router for the network.

11. The network device of claim 8, wherein, the one or more processors, when receiving the input, are to:
receive the input from another network device,
receive the input via a command line interface of the network device, or
receive the input from an application associated with the network device.

12. The network device of claim 8, wherein the plurality of conditions comprise:
a first condition associated with one or more first nodes in the network,
a second condition associated with one or more second nodes in the network, and
a third condition associated with one or more third nodes in the network,
wherein the first condition, the second condition, and the third condition are associated by a plurality of OR operators.

13. The network device of claim 8, wherein the label set is a part of a plurality of label sets, and the plurality of label sets comprise:
a first label set associated with a first condition,
a second label set associated with a second condition, and
a third label set associated with a third condition.

14. The network device of claim 8, wherein the one or more processors are further to:
identify one or more labels associated with each node identified in the plurality of conditions;
generate a label set based on the one or more labels; and
wherein the one or more processors, when transmitting the request for the label set that satisfies the plurality of conditions, are to:
transmit the request for the label set,
wherein the label set is based on the one or more labels.

15. A non-transitory computer-readable medium storing instructions, the instructions comprising:

one or more instructions that, when executed by one or more processors, cause the one or more processors to:
receive an input identifying:
one or more conditions associated with traversal of packets through a network,
wherein the one or more conditions comprise:
a first condition that a packet, of the packets, traverses along a path to a destination node through a particular sequence of nodes included in the path, and
a second condition that the packet is routed to avoid a network segment that includes a particular untrusted network, and
one or more actions, associated with a firewall policy, to be performed if the one or more conditions are satisfied;
transmit, to a path computation element, a request for a label set that satisfies the one or more conditions;
receive, from the path computation element and based on transmitting the request, the label set, that includes one or more subsets of labels,
wherein the label set identifies a particular sequence of labels associated with the particular sequence of nodes in the network;
identify a label stack of a packet that includes the label set;
compare the label set and the label stack of the packet to determine if one or more subset of labels in the label set are included in the label stack of the packet;
determine that the label stack of the packet satisfies the firewall policy based on comparing the label set and the label stack of the packet;
perform the one or more actions based on determining that the label stack of the packet satisfies the firewall policy, wherein the one or more actions are associated with the packet;
receive, from the path computation element, an updated label set based on changes in the network; and
automatically update the firewall policy to include the updated label set.

16. The non-transitory computer-readable medium of claim 15, wherein the one or more actions comprise at least one of:
routing the packet along an intended path,
rerouting the packet along another path, or
counting the packet.

17. The non-transitory computer-readable medium of claim 15, wherein, the one or more instructions, that cause the one or more processors to receive the input, cause the one or more processors to:
receive the input from another network device,
receive the input via a command line interface of the network device, or
receive the input from an application associated with the network device.

18. The non-transitory computer-readable medium of claim 15, wherein the network is a multiprotocol label switching segment routing network.

19. The non-transitory computer-readable medium of claim 15, wherein the one or more conditions comprise:
a first condition associated with one or more first nodes in the network,
a second condition associated with one or more second nodes in the network, and
a third condition associated with one or more third nodes in the network,
wherein the first condition and the second condition are associated by an AND operator, and
wherein the third condition is associated with the first condition and the second condition by a NOT operator.

20. The non-transitory computer-readable medium of claim 15, wherein the label stack includes a particular set of labels in the label stack that is selected for the one or more actions that are specified in a firewall policy.

* * * * *